United States Patent [19]

Reed et al.

[11] Patent Number: 4,839,048
[45] Date of Patent: Jun. 13, 1989

[54] CONTAINER FOR PRESSURIZED FLUID

[75] Inventors: Clayton L. Reed, Cortland; John D. Miller, Ithaca, both of N.Y.

[73] Assignee: Pall Corporation, Glen Cove, N.Y.

[21] Appl. No.: 883,504

[22] Filed: Jul. 8, 1986

[51] Int. Cl.⁴ ............................................. B01D 25/04
[52] U.S. Cl. .................................. 210/450; 210/453; 210/484; 210/485; 210/488; 210/497.01; 55/502
[58] Field of Search ......................... 55/493, 502, 504; 210/232, 440, 443, 446, 450, 453, 484, 485, 488, 497.01, 323.1, 323.2; 137/255, 386

[56] References Cited

U.S. PATENT DOCUMENTS

| | | | |
|---|---|---|---|
| 2,212,647 | 8/1940 | Nugent | 210/484 |
| 2,273,210 | 2/1942 | Lowther et al. | 55/504 |
| 2,855,103 | 10/1958 | Wilkinson | 210/484 |
| 3,147,220 | 9/1964 | Avery | 210/484 |
| 3,357,163 | 12/1967 | Burger et al. | 55/504 |
| 3,366,246 | 1/1968 | Goldsmith | 210/484 |
| 3,400,825 | 9/1968 | Shippey | 210/321 |
| 3,583,907 | 6/1971 | Borsanyi | 210/232 |
| 3,745,753 | 7/1973 | Risse | 55/504 |
| 3,890,236 | 6/1975 | Harrell | 210/484 |
| 4,080,294 | 3/1978 | Edwards et al. | 210/232 |
| 4,219,426 | 8/1980 | Spekle et al. | 210/232 |
| 4,378,293 | 3/1983 | Duke | 210/282 |
| 4,404,103 | 9/1983 | Drath | 210/446 |
| 4,476,023 | 10/1984 | Horikoshi et al. | 210/446 |
| 4,505,816 | 3/1985 | Wozniak et al. | 210/484 |
| 4,617,117 | 10/1986 | Messinger et al. | 210/450 |

FOREIGN PATENT DOCUMENTS

| | | | |
|---|---|---|---|
| 2034090 | 12/1970 | France | 210/484 |
| 1574998 | 9/1980 | United Kingdom | 210/484 |

OTHER PUBLICATIONS

Specification sheet, "Filter Housing", Model GEX-SA.
Specification sheet, "Plastic Disposable Filter Assembly", Filterite.

Primary Examiner—Richard V. Fisher
Assistant Examiner—Wanda L. Millard
Attorney, Agent, or Firm—Leydig, Voit & Mayer

[57] ABSTRACT

The disclosure described a pressurized fluid container comprising a fluid vessel, a sheath arrangement which may be fitted around the fluid vessel, and a mechanism for tightening the sheath around the fluid vessel. The disclosure also describes a filter assembly comprising a filter cartridge and sheath arrangement for supporting the filter cartridge against the pressure of a fluid flowing through the filter cartridge. The filter cartridge comprises an impervious shell, two end caps, and a porous filter unit. The shell has first and second ends, and the first and second end caps are respectively mounted at or near the first and second ends of the shell. At least one of the end caps may be slid along the shell and engages the shell to form a seal. The porous filter unit is positioned within the shell and has a first surface and a second surface. The filter cartridge further comprises an inlet structure containing an aperture which communicates with the first surface of the filter unit and an outlet structure containing an aperture which communicates with the second surface of the filter unit. The sheath arrangement includes a casing positioned within the shell and having first and second ends, first and second end restraints respectively mounted at or near the first and second ends of the casing, and a mechanism for fixing the first and second end restraints to the casing.

13 Claims, 3 Drawing Sheets

CONTAINER FOR PRESSURIZED FLUID

TECHNICAL FIELD

The present invention relates to a container for a pressurized fluid. In particular, it relates to a pressurized fluid container that may be conveniently and economically reused.

SUMMARY OF THE INVENTION

A high pressure fluid maintained within or flowing through a container exerts considerable force against the container. To ensure that the container is sufficiently strong to resist this force, the walls of many containers are very thick, resulting in very high material costs. If the container is not reusable, for example, because the fluid is contaminated with a substance which remains in the container, constantly providing new containers is exceedingly expensive.

The present invention provides a pressurized fluid container that may be economically reused. The container comprises a light-weight plastic fluid vessel which contains the fluid and a metal sheath which may be fitted around the plastic fluid vessel. The plastic fluid vessel includes a shell and first and second ends which seal against the shell but are capable of sliding along the shell in response to pressurization of the vessel. The first and second ends respectively include first and second end caps, each end cap having a peripheral groove and an O-ring positioned in the groove to form a sliding seal against the shell. Since the metal sheath provides the necessary structural strength, the plastic fluid vessel may have relatively thin walls and, therefore, is less expensive. The container further comprises a mechanism which releasably tightens the metal sheath around the plastic fluid vessel. With the container embodying the present invention, the plastic vessel may be conveniently and economically removed from the metal sheath and discarded while the sheath and tightening mechanism may be reused with a new plastic fluid vessel.

The present invention has many applications including, for example, applications in the filtering arts. Accordingly, the present invention also provides a filter cartridge for removing one or more substances from a fluid which is passed through the filter cartridge under pressure. The filter cartridge comprises an impervious shell, first and second end caps, and a porous filter unit. The shell has first and second ends, and the first and second end caps are respectively mounted at or near the first and second ends of the shell. At least one of the end caps includes a peripheral groove and an O-ring disposed in the groove. The O-ring seals against the shell but allows the end cap to slide along the shell in response to pressurization of the filter cartridge. The porous filter unit is positioned within the shell and has a first surface and a second surface. The filter cartridge further comprises an inlet structure containing an aperture which communicates with the first surface of the filter unit and an outlet structure containing an aperture which communicates with the second surface of the filter unit.

The present invention further provides a filter assembly comprising the filter cartridge described above and a sheath arrangement for supporting the filter cartridge against the pressure of the fluid flowing through the filter cartridge. The sheath arrangement includes a casing which is positioned about the shell and has first and second ends. The sheath arrangement also includes first and second end restraints respectively mounted at or near the first and second ends of the casing. Further, the sheath arrangement includes a mechanism for fixing the first and second end restraints to the casing.

The filter cartridge and the filter assembly according to the present invention are both reliable and economical. The forces generated by the pressurized fluid within the filter cartridge might fracture the filter cartridge if the end caps were rigidly connected to the shell. The forces of the pressurized fluid bear in different directions, i.e., radially against the shell and axially against the end caps. The stresses created by these differently directed forces at a rigid connection of the shell and the end cap may result in a fracture of the connection. However, in accordance with the present invention, at least one and preferably both of the end caps are free to slide along the shell rather than rigidly connected to the shell. Therefore, there is no rigid connection at which such stresses are generated by the differently directed forces and the filter cartridge is far less likely to fracture and, therefore, is far more reliable.

Further, since the filter cartridge is supported by the sheath arrangement, the filter cartridge may be fabricated from thinner and less rigid materials, decreasing material costs. This is particularly important since the filter cartridge may be frequently replaced. In addition, since the possibility of fracture at the junction of the end cap and the shell has been virtually eliminated, the filter cartridge may be fabricated to less exact tolerances, decreasing manufacturing costs. These decreased costs significantly enhance the economy of the filter cartridge.

DESCRIPTION OF PREFERRED EMBODIMENTS

Figure 1:
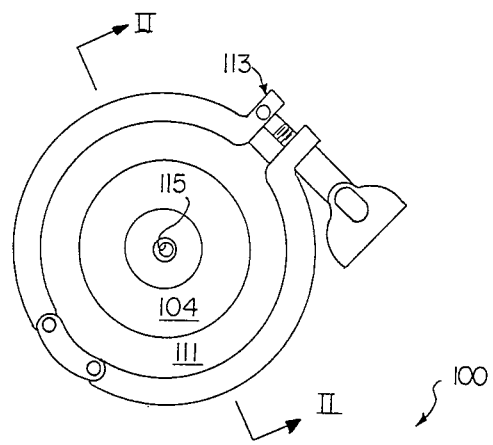
FIG. 1 is a plan view of an exemplary container embodying the present invention.
Figure 2:
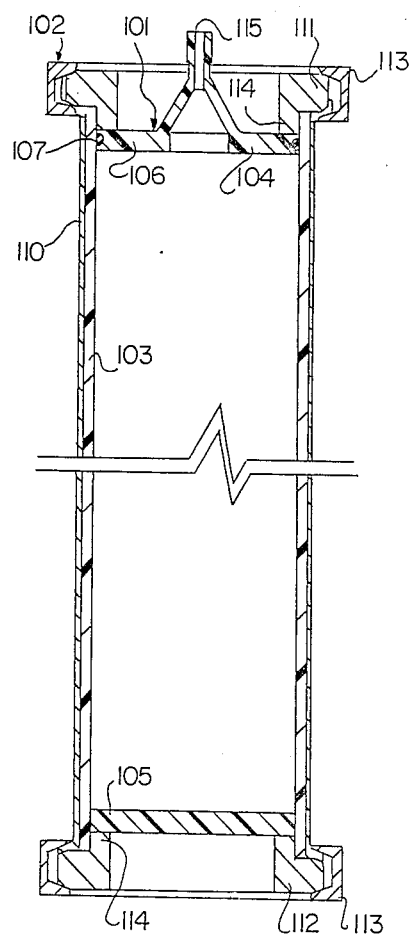
FIG. 2 is a sectional elevation view of the container of FIG. 1.

As shown in FIGS. 1 and 2, an exemplary pressurized fluid container 100 embodying the present invention generally comprises a fluid vessel 101 that contains the fluid and a sheath arrangement 102 that may be fitted around the fluid vessel 101 to provide the necessary structural support. Although the fluid vessel 101 may be fashioned from any suitably impervious material, it is preferably fashioned from a plastic or polymeric material, including plastics which are particularly resistant to the effects of many destructive or agressive fluids, such as strong acids or solvents. The sheath arrangement 102, which may be fashioned from any material which provides sufficient strength, is preferably fashioned from a light-weight metal such as aluminum.

Figure 3:
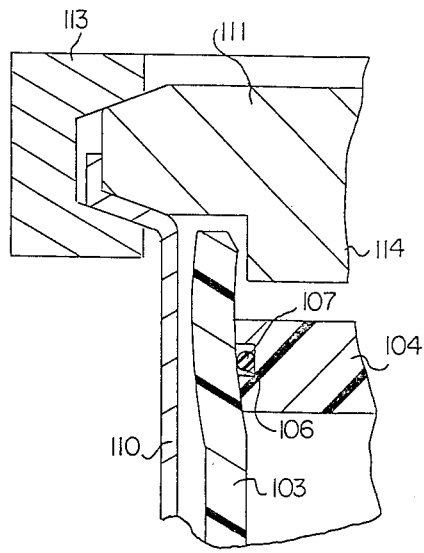
FIG. 3 is a partial sectional view of the container of FIG. 1 when it is depressurized.

The fluid vessel 101 generally includes a shell 103 and opposite end caps 104, 105. In accordance with one aspect of the invention, the end caps 104, 105 are mounted to the shell 103 in a manner which allows them to slide along the shell 103. For example, in the exemplary container 100, the end caps 104, 105 each have a peripheral groove 106 which contains an O-ring 107. The diameter of each end cap 104, 105 with the O-ring 107 is greater than the inside diameter of the shell 103. Hence, when the end caps 104, 105 are inserted into the shell 103, the ends of the shell 103 expand, as shown in FIG. 3. The elasticity of the shell 103 is sufficient to both firmly hold the end caps 104, 105 in place and maintain the integrity of the seal between the O-ring 107 and the shell 103.

The sheath arrangement 102 generally includes a casing 110 which fits around the shell 103, opposite end restraints 111, 112 which respectively fit adjacent the end caps 104, 105, and a mechanism 113, such as the clamp mechanism illustrated, which releasably tightens the casing 110 and end restraints 111, 112 around the fluid vessel 101. Alternatively, the tightening mechanism may comprise a threaded connection between the end restraints and the ends of the casing. In the exemplary container 100, each end restraint 111, 112 is beveled to fit a flanged end of the casing 110 and includes an axially projecting portion 114 for limiting the travel of the adjacent end cap 104, 105.

In use, one of the clamping mechanisms 113 is removed from the casing 110, the fluid vessel 101 is inserted into the casing 110, and then both clamping mechanisms 113 are tightened to tighten the casing 110 and the end restraints 111, 112 around the fluid vessel 101. The fluid vessel 101 may be dimensioned to be a loose fit within the sheath arrangement 102. This not only allows the fluid vessel 101 to be easily inserted into the sheath arrangement 102, but it also avoids the expensive machining that would be necessary for close tolerances.

Figure 4:
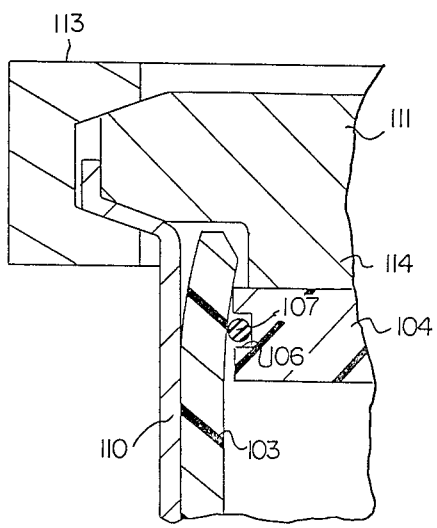
FIG. 4 is a partial sectional view of the container of FIG. 1 when it is pressurized.

The fluid vessel 101 may then be pressurized through an aperture 115 in an end cap 104. As the fluid vessel 101 is pressurized, the end caps 104, 105 slide along the shell 103 until they abut the end restraints 111, 112 and the shell 103 expands against the casing 110, as shown in FIG. 4. Thus, the radial forces on the vessel 101 are transmitted to the casing 110 where they are resisted by circumferential tension in the casing 110. The axial forces on the vessel 101 are transmitted through the end restraints 111, 112 and the tightening mechanism 113 to the casing 110, where they are resisted by longitudinal tension in the casing 110. Thus, in accordance with one aspect of the invention, the fluid vessel 101 transmits the burst forces to the metal sheath 102 thereby allowing the fluid vessel 101 to withstand internal pressures many times greater than its unsupported capability.

The preferred means of sealing the end caps 104, 105 to the shell 103 is shown in FIGS. 3 and 4. An elastomeric O-ring 106 is contained by either the end cap 104, 105 or shell 103 so as to seal both in a piston mode. The end cap 104, 105 is pressed into the shell 103 with sufficient interference so that when the fluid vessel 101 is pressurized, the shape assumed by the shell 103 is as depicted in FIG. 4—that is, one that results in a zero clearance (or a clearance sufficiently small) so as to prevent O-ring extrusion and subsequent loss of seal. The amount of interference is dependent on specific design, but is typically 40 to 90% of the total minimum clearance between end cap/shell assembly and the casing 110 inside diameter. This arrangement ensures a leaktight seal consistent with the reasonable dimensional tolerances required for producibility.

Once the fluid vessel 101 has been depressurized through the aperture 115 in the end cap 104, the contaminated fluid vessel 101 may be easily discarded by simply loosening a clamp mechanism 113 and then removing the fluid vessel 101 from the sheath assembly 102. A new fluid vessel 101 may then be conveniently and safely inserted into the reusable sheath arrangement 102 and the clamp mechanism 113 may then be again tightened around the end restraints 111, 112 and casing 110.

Figure 5:
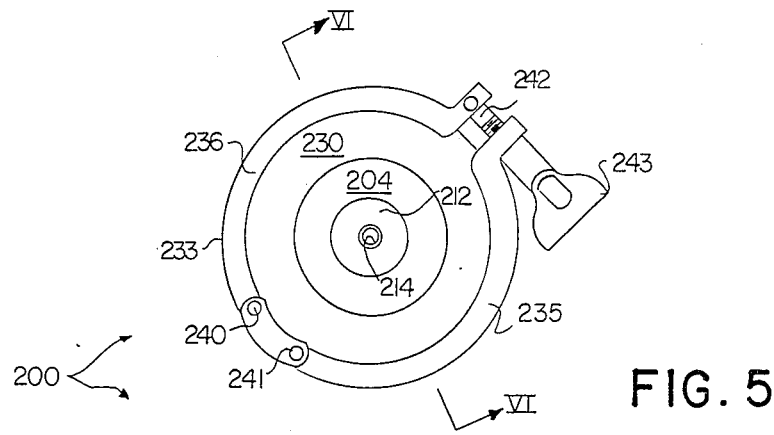
FIG. 5 is a plan view of an exemplary filter assembly embodying the present invention.
Figure 6:
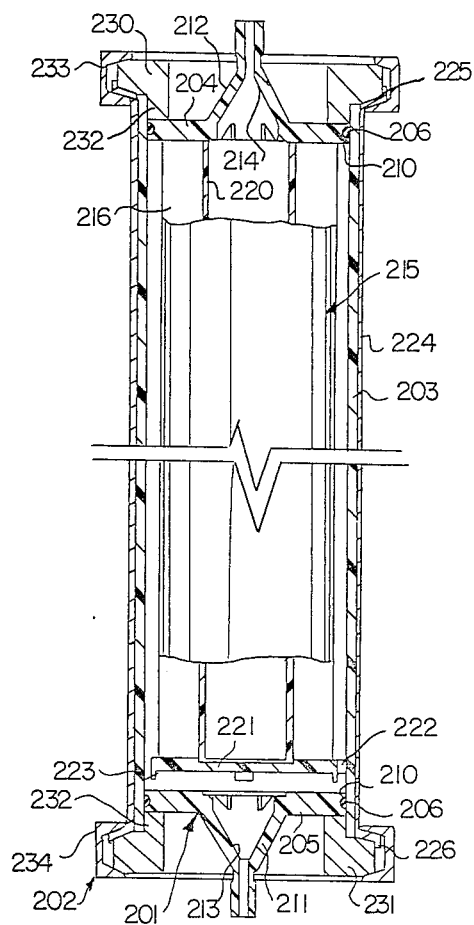
FIG. 6 is a sectional elevation view of the exemplary filter assembly as viewed along line VI—VI.

The container embodying the present invention may have many applications including, for example, applications in the filtering arts. As shown in FIGS. 5 and 6, an exemplary filter assembly 200 embodying the present invention generally comprises a filter cartridge 201, which serves as a fluid vessel, surrounded by a sheath arrangement 202, which may be identical to the sheath arrangement 102 of the exemplary container 100.

The filter cartridge 201 includes a cylindrical shell 203. The shell 203 may be fabricated from any suitably impervious material compatible with the fluid, including a plastic or polymeric material. For example, for highly destructive or aggressive fluids such as strong acids or solvents, the shell 203 may be fabricated from a fluoropolymeric material, such as PFA. Fluoropolymeric materials are relatively immune to the harmful effects of such destructive fluids.

The filter cartridge 201 also includes first and second end caps 204, 205 which are mounted near the first and second ends, respectively, of the shell 203. In accordance with one aspect of the invention, the end caps 204, 205 are mounted to the shell 203 in a manner which allows the end caps 204, 205 to slide along the shell 203. For example, in the exemplary filter assembly 200, each end cap 204, 205 is mounted within the shell 203 and includes an O-ring 206 contained in a peripheral groove 210. The O-ring 206 is compressed against the shell 203, allowing the end cap 204, 205 to slide along the shell 203 while maintaining an effective seal between the shell 203 and the end cap 204, 205. Both the end caps 204, 205 and the O-rings 206 may also be fabricated from any suitably impervious material compatible with the fluid. For example, the end caps 204, 205 may be fabricated from a metal or from a plastic or polymeric material, and the O-ring may be fabricated from any suitable elastomeric material. Again, for highly destructive fluids, the end caps 204, 205 may be fabricated from a fluoropolymer while the O-ring 206 may comprise an elastomeric material sheathed in a fluoropolymeric wrapper.

To allow the fluid to pass through the filter cartridge 201, any suitable inlet and outlet may be provided. In the exemplary filter assembly 200, the inlet and outlet comprise conical protrusions 211, 212 formed in the second and first end caps 205, 204, respectively, each protrusion 211, 212 containing an aperture 213, 214 which communicates with the interior of the shell 203. The protrusions 211, 212 extend toward the exterior of the shell 203, each terminating in a nipple to facilitate attaching the filter cartridge 201 to an appropriate fluid line (not shown). Alternatively, the inlet and outlet may both be disposed in a single end cap.

The filter cartridge 201 further includes a filter unit 215 for removing one or more substances from the fluid. The filter unit may be variously configured and may be structured to remove any of a variety of substances without departing from the scope of the invention. For example, the filter unit may be configured as a solid cylinder sealed against the shell 203 so the fluid may be directed axially through the filter unit. Further, the filter unit may be structured to include a sorbent material so one or more components of the fluid may be sorbed from the fluid.

In the exemplary filter assembly 200, the filter unit 215 preferably includes a hollow, cylindrical filter element 216 surrounding a perforated core 220. The exterior surface of the filter element 216 communicates with the aperture 213 in the inlet protrusion 211 while the interior surface of the filter element 216 communicates with the aperture 214 in the outlet protrusion 212. Both the filter element 216 and the perforated core 220 are joined at one end to a blind end cover 221. The other end of the filter element 216 and the core 220 is joined to the first end cap 204 with the aperture 214 in the outlet protrusion 212 communicating directly with the interior of the filter unit 215. The filter element 216 and core 220 may be joined to the end cap 204 and the end cover 221 in any suitable manner, for example, by an adhesive or by heat sealing.

The filter element 216 may include any suitably porous filter medium which is fabricated from a material compatible with the fluid being filtered. For example, the filter element may include a porous membrane fabricated from a polymeric, e.g., a fluoropolymeric, material. Alternatively, the filter element may include a microfibrous, non-pleated cylindrical filter medium fabricated from any of several polymeric materials. Such a filter is available from Pall Corporation under the trademark Profile. In the exemplary filter assembly 200, the filter element 216 includes a woven or non-woven microfibrous pleated filter medium fabricated, for example, from a polymeric material.

The perforated core 220 supports the filter element 216 and may be fabricated from any material compatible with the fluid being filtered, including a metal or a plastic or polymeric material. Similarly, the end cover 221 may be fashioned from any suitably impervious material compatible with the fluid, including a plastic or polymeric material. The end cover 221 may further include radially extending centering lugs 222 to properly center the filter unit 215 within the shell 203 and axially extending standoff lugs 223 to maintain a minimum spacing between the second end cap 205 and the filter unit 215.

The sheath arrangement 202 includes a cylindrical casing 224 with an inner diameter corresponding to the outer diameter of the shell 203 of the filter cartridge 201. The casing 224 has first and second flared ends 225, 226 and may be fabricated from any material sufficiently strong and rigid to support the filter cartridge 201 against the pressure of the fluid. While any sufficiently strong and rigid metallic or polymeric material would suffice, the casing 224 of the exemplary filter assembly 200 is preferably fabricated from aluminum.

The sheath arrangement 202 also includes identical first and second end restraints 230, 231 fitted to the first and second flared ends 225, 226, respectively, of the casing 224. The end restraints 230, 231 each have a generally annular configuration, the inlet and outlet protrusions 211, 212 extending outwardly through the center of the second and first end restraints 231, 230, respectively. Each end restraint 230, 231 has an annular stop 232 which extends into the shell 203 to limit the output sliding of the adjacent end cap 204, 205. The end restraints 230, 231 may also be fabricated from any material sufficiently strong and rigid to support the filter cartridge 201 against the pressure of the fluid, including a polymeric material or a metallic material such as aluminum.

To rigidly fix the end restraints 230, 231 to the casing 224, the sheath arrangement 202 includes first and second clamp rings 233, 234, which are identical to the clamping mechanism 113 of the exemplary container 100. Each clamp ring 233, 234 has two arms 235, 236 which are pivotable about two pivot pins 240, 241, allowing a bolt 242 at the end of one arm 235 to engage or disengage a wing nut 243 at the end of the other arm 236. Alternatively, the end restraints 230, 231 and casing 224 may be interconnected in any manner sufficient to support the filter cartridge 201. For example, the end restraints 230, 231 may be threaded to the casing 224 or a tie rod arrangement spanning the casing 224 between the end restraints 230, 231 may be utilized.

In the preferred mode of operation, the exemplary filter assembly 200 is attached to a fluid line (not shown) by means of the nipples on the first and second end caps 204, 205, and the fluid is then passed under pressure through the filter cartridge 201. Entering the filter cartridge 201 through the inlet protrusion 211, the fluid flows into the shell 203 and then passes radially inwardly through the filter element 216 where one or more substances, such as particulate contaminants, are removed. From the filter element 216, the fluid flows axially along the interior of the filter unit 215 and exits through the outlet protrusion 212. Alternatively, the fluid may be directed through the protrusion 212 in the first end cap 204, radially outwardly through the filter element 216, and then through the protrusion 211 in the second end cap 205. For flow radially outwardly through the filter element 216, certain well known structural changes may be required of the filter unit 215, including the addition of an outer cage adjacent the filter element.

In accordance with one aspect of the invention, as the pressurized fluid within the filter cartridge 201 bears against the end caps 204, 205, the end caps 204, 205 slide along the shell 203 until they abut the end restraints 230, 231 of the sheath arrangement 202. If the end caps 204, 205 were rigidly connected to the shell 203, the filter cartridge 201 might fracture at the connection due to stresses generated by the differently directed forces acting on the shell 203 and the end caps 204, 205. The forces acting on the shell 203 are directed generally radially while the forces acting on the end caps 204, 205 are directed generally axially. By including end caps 204, 205 which slide along the shell 203, there are no stresses generated at the interface of the shell 203 and the end cap 204, 205 by these differently directed forces and, therefore, the filter cartridge 201 according to the present invention is far less likely to fracture. The preferred means of sealing the end caps 204, 205 to the shell 203 is identical to that shown in FIGS. 3 and 4 for the exemplary pressurized fluid container 100, as previously described.

Once the filter cartridge 201 becomes clogged, it may be replaced by simply interrupting the flow of fluid and detaching the fluid line from the inlet and outlet protrusions 211, 212. The wing nut 243 of one of the clamp rings 233 is then loosened from the bolt 242 and both the clamp ring 233 and the end restraint 230 are removed from the casing 224. The filter cartridge 201 is then withdrawn from the open end of the casing 224 and a new filter cartridge 201 is inserted. The end restraint 230 and clamp ring 233 are then again fixed to the casing 224 and the new filter cartridge 201 is then reattached to the fluid line. Flow of the fluid is then resumed.

With the filter assembly 200 according to the present invention, the filter cartridge 201 may be fabricated far less expensively. Since it is supported by the sheath arrangement 202, the filter cartridge 201 may be fabricated from thinner and less rigid materials, decreasing material costs. Further, since the possibility of fracture at the junction of the end caps 204, 205 and the shell 203 has been virtually eliminated, it can be fabricated to less exact tolerances, decreasing manufacturing costs.

Although the invention has been described in terms of several exemplary embodiments, it is not limited to those embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention.

We claim:

1. A container for pressurized fluid, comprising a plastic fluid vessel including a shell and first and second end means for sealingly engaging the shell and sliding along the shell in response to pressurization of the vessel, the first and second end means including first and second end caps mounted within the shell, each end cap having a peripheral groove and an O-ring disposed within the groove for forming a slideable seal against the shell; a sheath arrangement which may be fitted around the fluid vessel; and means for releasably tightening the sheath arrangement around the plastic fluid vessel whereby the vessel may be safely removed from the sheath and discarded while the sheath and tightening means are maintained for reuse.

2. The container of claim 1 wherein the first end means is blind and the second end means has at least one flow passage to the interior of the shell.

3. The container of claim 1 wherein the plastic fluid vessel includes means for filtering the fluid.

4. A filter cartridge comprising an impervious shell having first and second ends, first and second end caps operatively associated with the first and second ends, respectively, of the shell, at least one end cap including means for sealingly engaging the shell and allowing the end cap to slide along the shell in response to pressurization of the filter cartridge, the sealingly engaging means including a peripheral groove formed in the end cap and an O-ring disposed in the groove, a porous filter unit disposed within the shell and having first and second surfaces, inlet means for defining an aperture which communicates with the first surface of the filter unit, and outlet means for defining an aperture which communicates with the second surface of the filter unit.

5. The filter cartridge of claim 4 wherein both the first and second end caps include sealingly engaging means.

6. The filter cartridge of claim 4 wherein the first end cap includes the sealingly engaging means, wherein the porous filter unit includes a hollow, cylindrical filter element having first and second ends and a blind end cover, the first end of the filter element being mounted to the first end cap and the second end of the filter element being mounted to the blind end cover, and wherein the outlet means comprises a protrusion which is formed in the first end cap and extends away from the filter unit, the protrusion containing an aperture which communicates with the interior surface of the filter element through the first end of the filter element.

7. The filter cartridge of claim 6 wherein the blind end cover includes centering lugs extending radially into engagement with the shell.

8. The filter cartridge of claim 4 wherein the second end cap includes the sealingly engaging means, wherein the porous filter unit includes a hollow cylindrical filter element having first and second ends and a blind end cover, the first end of the filter element being mounted to the first end cap and the second end of the filter element being mounted to the blind end cover, and wherein the inlet means comprises a protrusion which is formed in the second end cap and extends away from the filter unit, the protrusion containing an aperture which communicates with the exterior surface of the filter element.

9. The filter cartridge of claim 8 wherein the blind end cover of the filter element includes stand-off lugs extending axially toward the second end cap.

10. A filter assembly comprising a filter cartridge including an impervious shell having first and second ends, first and second end caps operatively associated with the first and second ends, respectively, of the shell, the first end cap including means for sealingly engaging the shell and allowing the end cap to slide along the shell in response to pressurization of the filter assembly, the sealingly engaging means including a peripheral groove formed in the end cap and an O-ring disposed in the groove, a porous filter unit disposed within the shell and having first and second surfaces, inlet means for defining an aperture communicating with the first surface of the porous filter unit, and outlet means for defining an aperture communicating with the second surface of the porous filter element and a sheath arrangement including a casing disposed about the shell having first and second ends, first and second end restraints cooperatively arranged with the first and second ends, respectively, of the casing, and means for fixing the first and second end restraints to the casing.

11. The filter assembly of claim 10 wherein the first end restraint is disposed near the first end cap and includes stop means for limiting the sliding of the first end cap.

12. The filter assembly of claim 10 wherein the fixing means comprises first and second clamps releasably mounted to the first and second ends, respectively, of the casing.

13. A filter assembly comprising a filter cartridge including an impervious shell having first and second ends, first and second end caps operatively associated with the first and second ends, respectively, of the shell, the first end cap being slidably mounted to the shell and including means for sealingly engaging the shell, a porous filter unit disposed within the shell having first and second surfaces, inlet means for defining an aperture communicating with the first surface of the porous filter unit, and outlet means for defining an aperture communicating with the second surface of the porous filter element and a sheath arrangement including a casing disposed about the shell and having first and second ends, first and second end restraints cooperatively arranged with the first and second ends, respectively, with the casing, the first end restraint being disposed near the first end cap and including a protrusion being disposed near the first end cap and including a protrusion extending into the shell for limiting the sliding of the first end cap, and means for fixing the first and second end restraints to the casing.

* * * * *